United States Patent
Liu et al.

(10) Patent No.: US 9,377,822 B2
(45) Date of Patent: Jun. 28, 2016

(54) ELECTRONIC DEVICE AND COMPONENT-POSITIONING MODULE THEREOF

(71) Applicant: Acer Inc., New Taipei (TW)

(72) Inventors: Chia-Chieh Liu, New Taipei (TW);
Kuan-Chang Huang, New Taipei (TW);
Chung-Jen Ho, New Taipei (TW);
Chih-Wei Liao, New Taipei (TW);
Chun-Hsien Wu, New Taipei (TW)

(73) Assignee: Acer Inc., New Taipei (TW)

(*) Notice: Subject to any disclaimer, the term of this patent is extended or adjusted under 35 U.S.C. 154(b) by 52 days.

(21) Appl. No.: 14/538,863

(22) Filed: Nov. 12, 2014

(65) Prior Publication Data
US 2015/0234435 A1  Aug. 20, 2015

(30) Foreign Application Priority Data

Feb. 14, 2014  (TW) .............................. 103104833 A

(51) Int. Cl.
*G06F 1/16* (2006.01)

(52) U.S. Cl.
CPC .............. *G06F 1/1681* (2013.01); *G06F 1/162* (2013.01); *Y10T 16/5327* (2015.01)

(58) Field of Classification Search
CPC ....... G06F 1/1681; G06F 1/1689; G06F 1/16; G06F 1/162; Y10T 16/5327
USPC ............. 361/679.04–679.09, 679.21–679.29, 361/679.57–679.59, 681, 682, 683; 248/917–924; 16/374, 366–369; 455/575.1, 575.3
See application file for complete search history.

(56) References Cited

U.S. PATENT DOCUMENTS

| | | | | |
|---|---|---|---|---|
| 6,845,546 B1* | 1/2005 | Lu | ........................... | G06F 1/162 16/331 |
| 6,867,961 B2* | 3/2005 | Choi | ..................... | G06F 1/1681 248/176.3 |
| 7,123,472 B2* | 10/2006 | Huang | ................... | F16M 11/12 16/367 |
| 7,191,492 B2* | 3/2007 | Yang | ..................... | G06F 1/1679 16/374 |
| 7,234,204 B2* | 6/2007 | Liu | ......................... | G06F 1/162 16/367 |
| 7,308,733 B2* | 12/2007 | An | .......................... | G06F 1/162 16/367 |
| 7,375,956 B2* | 5/2008 | Chuang | .................... | E05D 3/10 16/312 |
| 8,300,391 B2* | 10/2012 | Hu | ......................... | G06F 1/162 248/917 |
| 9,198,312 B2* | 11/2015 | Zhang | ..................... | G06F 1/162 |
| 2003/0167600 A1* | 9/2003 | Chien | ..................... | G06F 1/162 16/367 |

(Continued)

*Primary Examiner* — Hoa C Nguyen
*Assistant Examiner* — Sagar Shrestha
(74) *Attorney, Agent, or Firm* — Alan D. Kamrath; Kamrath IP Lawfirm, P.A.

(57) ABSTRACT

A component-positioning module comprises an elastic member, a plurality of fastening members, a plurality of adjustment elements and a positioning element. The elastic member is secured to a first component of the electronic device by the plurality of fastening members, and an operative portion of the elastic member is movable in a linear extension direction substantially perpendicular to an outer surface of the first component. The plurality of adjustment elements are secured between the elastic member and the first component by the fastening members respectively; the positioning element is combined with the operative portion to position a second component of the electronic device, and the positioning element at least partially protrudes from the outer surface. Manipulation of the plurality of fastening members deforms the plurality of adjustment elements and changes a distance of the positioning element protruding from the outer surface.

14 Claims, 6 Drawing Sheets

(56) References Cited

U.S. PATENT DOCUMENTS

2004/0012920 A1* 1/2004 Tanimoto ............... G06F 1/162 361/679.27

2004/0083577 A1* 5/2004 Lu ........................... G06F 1/162 16/367

2011/0252601 A1* 10/2011 Lin ....................... G06F 1/1681 16/280

* cited by examiner

ELECTRONIC DEVICE AND COMPONENT-POSITIONING MODULE THEREOF

BACKGROUND OF THE INVENTION

1. Field of the Invention

The present invention relates to a component-positioning module, and more particularly, to a component-positioning module allowing adjustment of a positioning height. The present invention further comprises an electronic device having the component-positioning module.

2. Description of the Related Art

The design of laptop computers and the combination of tablet computers and docking stations have become the mainstream of portable electronic device development. By dismounting or rotating the screen, users may switch the modes between a laptop computer and a tablet computer and thereby enjoy the convenience of multiple modes integrated in a single device.

As shown in FIG. 1, for a conventional laptop computer 90 with a rotatable screen 91, two sides of the screen 91 are respectively connected with brackets 93, and each bracket 93 has two ends pivotally connected with the screen 91 and the base 92 respectively, such that the screen 91 is rotatable relative to the base 92 and relative to the brackets 93 to allow the orientation of the screen 91 to be changed. To avoid unintended rotation of the screen 91, positioning modules 94 may be disposed on the base 92 to limit the rotation of the screen 91 through the interaction between the screen 91 and a positioning element of the positioning modules 94.

In the above-described device configuration, a gap is retained between the base 92 and the screen 91. However, due to the tolerance existing in the production of the base 92 and the screen 91, in the assembly of the two components and in the positioning module 94, said gap formed in each device may not always be the same. Therefore, it is difficult to ensure that the positioning module 94 of each device provides a satisfactory screen limitation effect, and this difficulty can significantly reduce the yield of the production of such devices.

SUMMARY OF THE INVENTION

A main objective of this invention is to provide a component-positioning module allowing adjustment of the positioning height.

To achieve the aforesaid objective, the component-positioning module of the present invention is applicable to an electronic device which comprises a first component and a second component rotatable relative to the first component. The component-positioning module comprises an elastic member, a plurality of fastening members, a plurality of adjustment elements and a positioning element. The elastic member comprises a first end, a second end and an operative portion, the elastic member being secured to the first component with the first end and the second end, and the operative portion being movable in a linear extension direction substantially perpendicular to an outer surface of the first component. The plurality of fastening members are configured for fastening the first end and the second end to the first component. The plurality of adjustment elements are secured between the elastic member and the first component by the fastening members respectively. The positioning element is combined with the operative portion to position the second component, and the positioning element at least partially protrudes from the outer surface. Manipulation of the plurality of fastening members deforms the plurality of adjustment elements and thereby changes a distance of the positioning element protruding from the outer surface.

This invention further comprises an electronic device comprising the aforesaid component-positioning module.

Using the above-described design, according to the size of the space formed between the first component and the second component of the electronic device, users may adjust the plurality of fastening members to deform the plurality of adjustment elements so as to move the operative portion of the elastic member and to further change the distance of the positioning element protruding from the outer surface. Accordingly, when the second component is rotated to a certain position relative to the first component, the second component encounters structural interference from the positioning element, and the interaction therebetween can facilitate positioning.

DETAILED DESCRIPTION OF THE PREFERRED EMBODIMENT

The advantages and innovative features of the invention will become more apparent from the following detailed description when taken in conjunction with the accompanying drawings.

Figure 1:
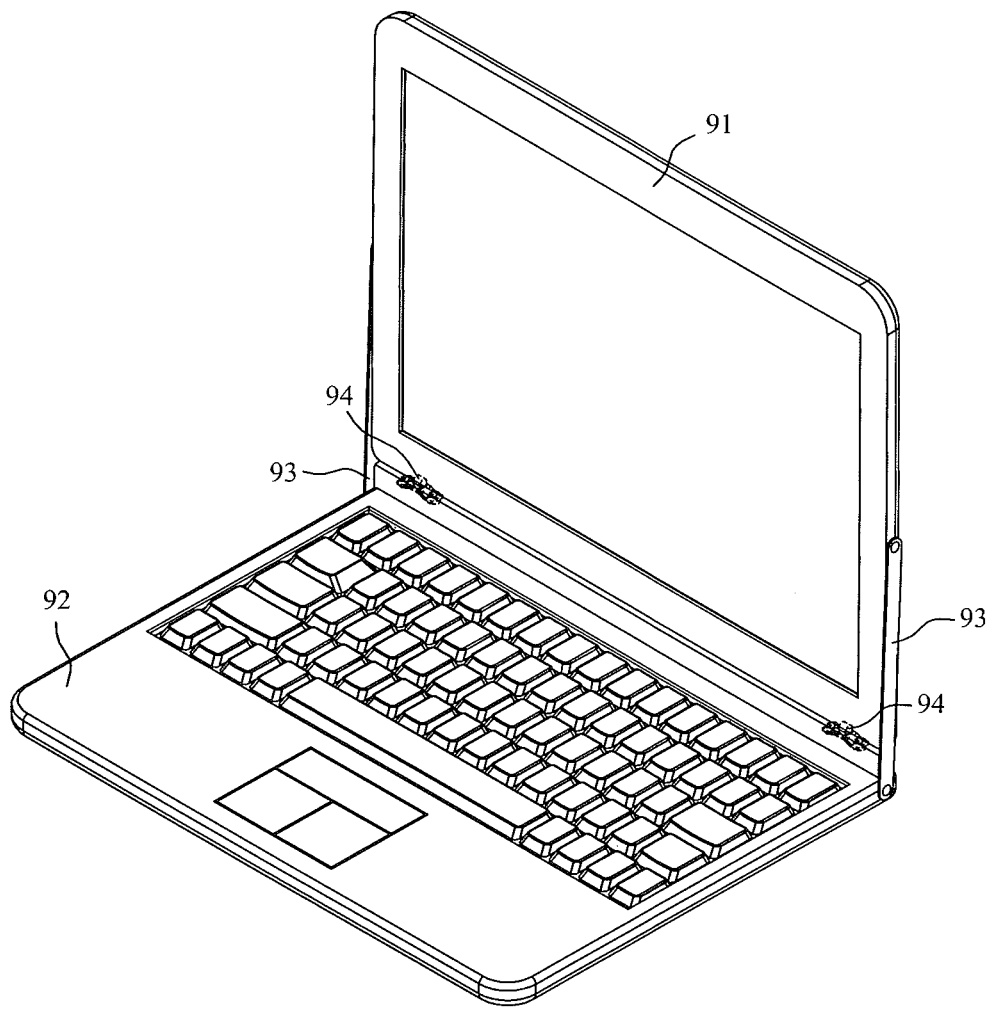
FIG. 1 illustrates a conventional laptop computer.
Figure 2:
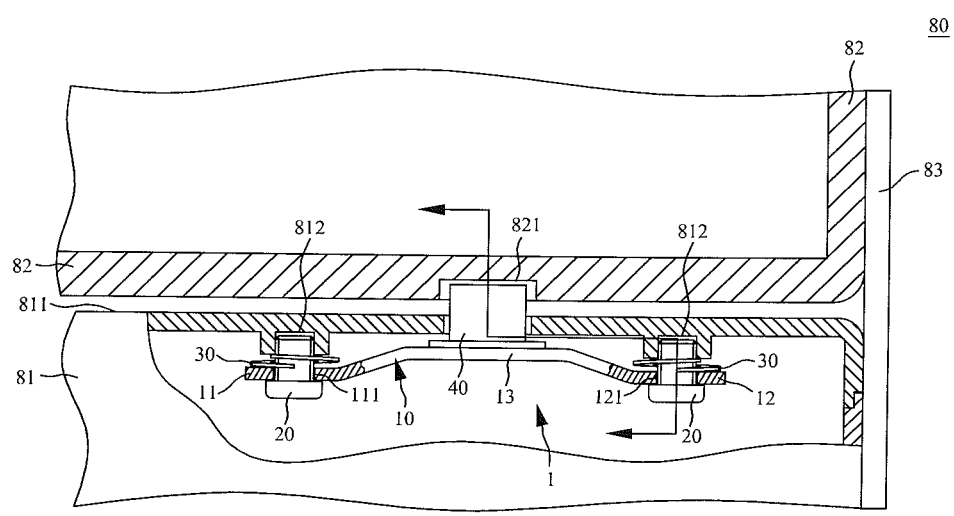
FIG. 2 illustrates the component-positioning module according to the present invention used in an electronic device.

FIG. 2 illustrates the component-positioning module 1 according to the present invention used in an electronic device 80.

The component-positioning module 1 of this invention is mainly applicable to an electronic device 80, such as an electronic device with a rotatable or convertible screen, such as a laptop computer, a tablet computer integrated with a docking station, or any other electronic device with a similar structural configuration, but not limited thereto. As illustrated in FIG. 2, the electronic device 80 comprises a first component 81 and a second component 82 pivotally connected to the first component 81 and thereby rotatable relative to the first component 81. In the following embodiments, the first component 81 may be the base of the electronic device 80 or the rotatable holder pivotally connected to the base, and the second component 82 may be the display screen of the electronic device 80. For illustrative purposes only, the second component 82 is pivotally connected to the first component 81 by a lateral bracket structure 83.

The component-positioning module 1 of the present invention comprises an elastic member 10, a plurality of fastening members 20, a plurality of adjustment elements 30 and a positioning element 40. The elastic member 10 comprises a first end 11, a second end 12 and an operative portion 13, wherein the first end 11 and the second end 12 are two opposite ends, and the operative portion 13 is situated between the first end 11 and the second end 12. The first end 11 is provided with a first hole 111, and the second end 12 is provided with a second hole 121.

The elastic member 10 is secured to the first component 81 with the first end 11 and the second end 12, such that the elastic member 10 is substantially parallel to the outer surface 811 of the first component 81. The operative portion 13, being elastically resilient, is movable in a linear extension direction substantially perpendicular to the outer surface 811 of the first component 81. In one embodiment of this invention, the elastic member 10 forms a flat spring structure with a curvature or a concavity, such as a U-shaped structure; however, this invention is not limited thereto.

The plurality of fastening members 20 are configured to respectively secure the first end 11 and the second end 12 of the elastic member 10 to the first component 81. In one embodiment of this invention, each fastening member 20 is a bolt member, and two fastening members 20 are respectively passed through the first hole 111 of the first end 11 and the second hole 121 of the second end 12 and fastened in the corresponding holes 812 of the first component 81 by the threaded structure. It should be noted that the structure and number of the fastening members 20 are not limited to the embodiment above.

The plurality of adjustment elements 30 are secured between the elastic member 10 and the first component 81 by the fastening members 20 respectively. When the elastic member 10 is secured to the first component 81 by two fastening members 20, the two fastening members 20 may also be used to secure the adjustment elements 30. In one embodiment of this invention, at least one adjustment element 30 is disposed between the first end 11 and the first component 81, and at least one adjustment element 30 is disposed between the second end 12 and the first component 81, wherein the numbers of adjustment elements 30 arranged correspondingly at two ends are the same. In this embodiment, the adjustment elements 30 are made of a metal or an alloy material.

The positioning element 40, which is combined with the operative portion 13, may slide into the recess 821 of the second component 82 and engage or interfere with the second component 82 to position the second component 82. The positioning element 40 is extended toward the outer surface 811 of the first component 81, such that the positioning element 40 at least partially protrudes from the outer surface 811. The end or tip of the positioning element 40 protruding from the outer surface 811 is configured as a rounded or curved end, such that the positioning element 40 may smoothly slide into or out of the recess 821.

When the positioning element 40 is pressed by an external force and moved toward the interior of the first component 81, the operative portion 13 of the elastic member 10 is correspondingly driven to move; in the absence of external force, the elastic resilience of the operative portion 13 allows the positioning element 40 to re-protrude from the outer surface 811 to the maximum extent.

Figure 3A:
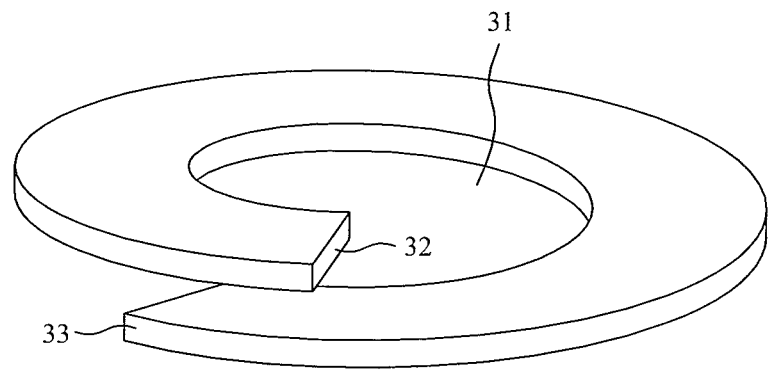
FIG. 3A illustrates a first embodiment of the adjustment element of the component-positioning module according to the present invention.
Figure 3B:
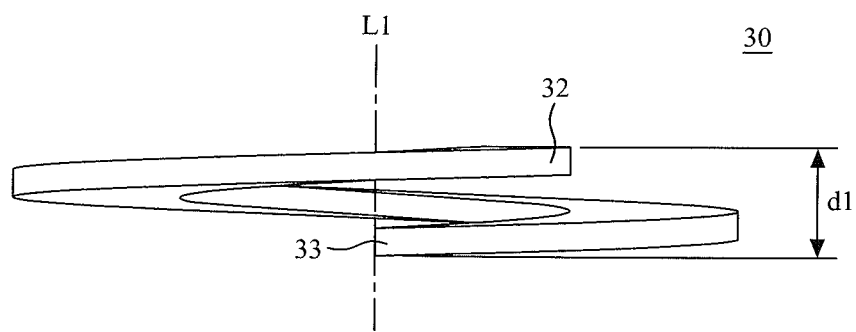
FIG. 3B illustrates a side view of the first embodiment of the adjustment element of the component-positioning module according to the present invention.

Please refer to FIGS. 3A and 3B, where FIG. 3A illustrates a first embodiment of the adjustment element 30 of the component-positioning module 1 according to the present invention, and FIG. 3B illustrates a side view of the first embodiment of the adjustment element 30 of the component-positioning module 1 according to the present invention. As shown, in one embodiment of this invention, the adjustment element 30 is a spiral cushion structure which comprises a fastening hole 31 allowing passage for the fastening member 20 and two terminals 32, 33, such that the adjustment element 30 has a structure similar to a spring, with two terminals 32, 33 located at different levels. In other words, the adjustment element 30 forms a height d1 and is deformable in an axial direction L1 of the fastening hole 31 to reduce the height d1. Therefore, once the adjustment element 30 is pressed and elastically deformed, the height d1 of the adjustment element 30 is changed correspondingly.

Figure 4:
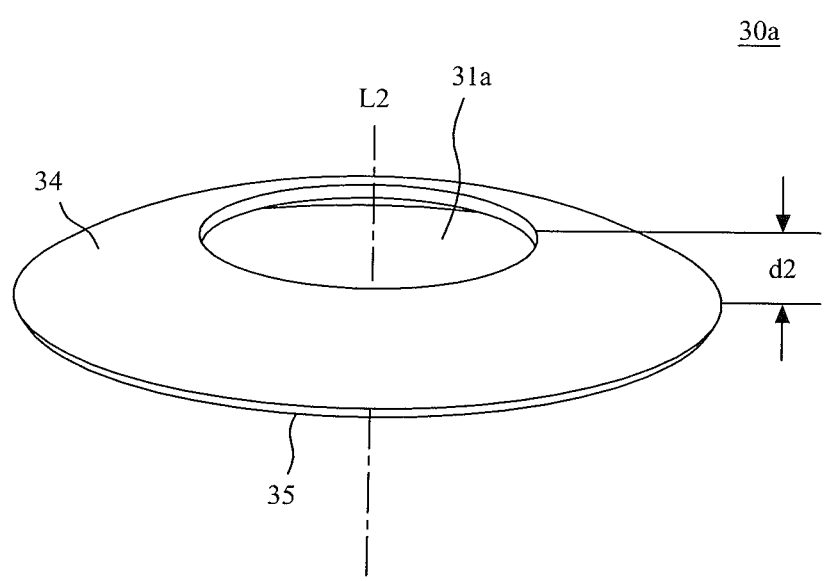
FIG. 4 illustrates a second embodiment of the adjustment element of the component-positioning module according to the present invention.

FIG. 4 illustrates a second embodiment of the adjustment element 30a of the component-positioning module 1 according to the present invention. As illustrated, in another embodiment of this invention, the adjustment element 30a has a cushion structure with curvature, which comprises a fastening hole 31a allowing passage for the fastening member 20, a first side 34 and a second side 35. By concaving or bending the first side 34 and the second side 35 at the same direction to form the curvature, the adjustment element 30a forms a structure similar to a hollow disk. Likewise, the adjustment element 30a also has a height d2 and is deformable in an axial direction L2 of the fastening hole 31a to reduce the height d2. Therefore, once the adjustment element 30a is pressed and elastically deformed, the height d2 of the adjustment element 30a is changed correspondingly as well.

Figure 5:
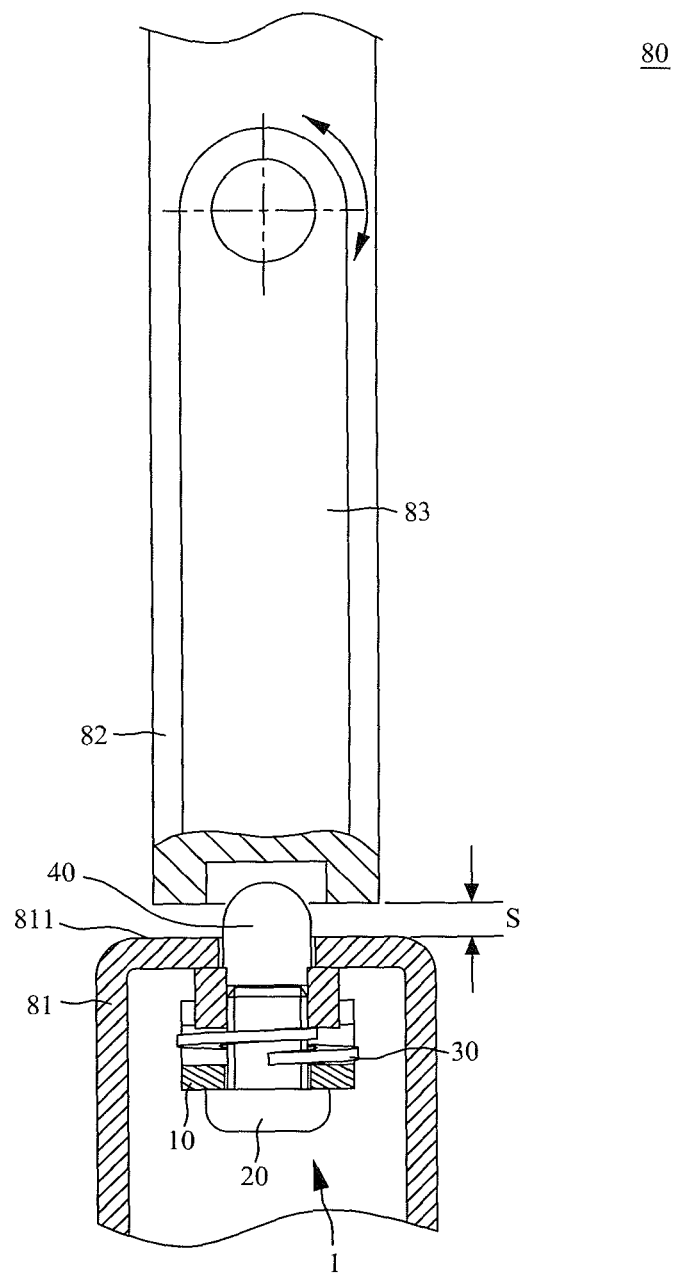
FIG. 5 illustrates a cross-sectional view of the component-positioning module according to the present invention used in an electronic device.
Figure 6:
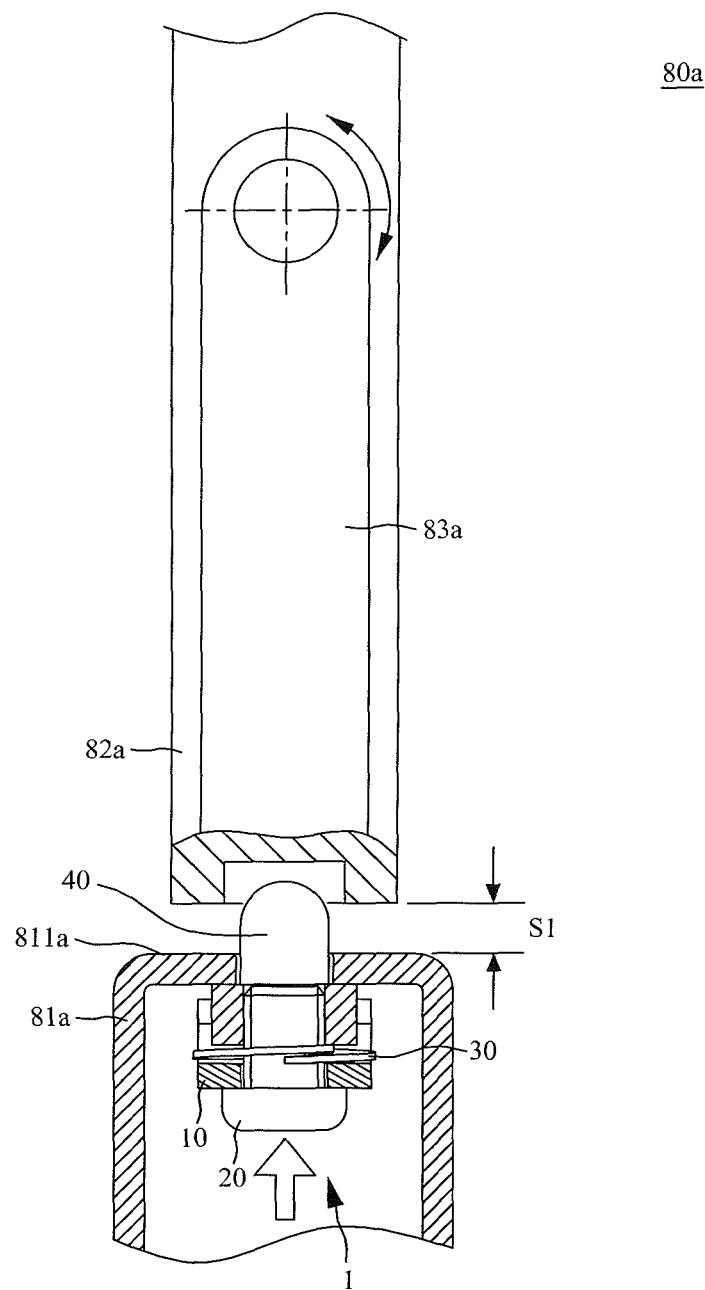
FIG. 6 illustrates a cross-sectional view of the component-positioning module according to the present invention used in another electronic device.

Referring to FIGS. 5 and 6, where FIG. 5 illustrates a cross-sectional view of the component-positioning module 1 according to the present invention used in an electronic device 80, and FIG. 6 illustrates a cross-sectional view of the component-positioning module 1 according to the present invention used in another electronic device 80a. It should be noted that in FIGS. 5 and 6, the first embodiment of the adjustment element 30 is employed for illustration purposes, and only a part of the second component 82 or 82a is shown.

As shown in FIG. 5, the space between the first component 81 and the second component 82 of the electronic device 80 is defined as S, and the elastic member 10 is secured to the first component 81 by the fastening member 20. When the adjustment element 30 is not pressed and deformed, the distance of the positioning element 40 protruding from the outer surface 811 of the first component 81 is sufficient to provide effective interference to the second component 82 rotated to a certain position to thereby provide the positioning effect.

As shown in FIG. 6, the space between the first component 81a and the second component 82a of the electronic device 80a is defined as S1, and the space S1 is greater than the space S of the electronic device 80 mentioned above. In this situation, the positioning element 40 of the component-positioning module 1 according to the present invention fails to provide effective interference to the second component 82a. Therefore, users need to manipulate the plurality of fastening members 20 to deform the plurality of adjustment elements 30 so as to move the elastic member 10 relative to the first component 81 a and change the distance of the positioning element 40 protruding from the outer surface 811a.

After manipulation and adjustment, the distance of the positioning element 40 protruding from the outer surface 811 a is sufficient to provide effective interference to the second component 82a rotated to a certain position. That is, the same component-positioning module 1 can be applicable to different electronic devices 80 and 80a. By simply using the plurality of fastening members 20 to adjust the extent of deformation of the plurality of adjustment elements 30, the distance of the positioning element 40 protruding from the outer surface 811 or 811*a* can be altered. Accordingly, through the adjustable configuration mentioned above, the component-positioning module 1 of this invention is suitable for various electronic devices, providing convenience in use and saving the costs.

It is noted that the above-mentioned embodiments are only for illustration. It is intended that the present invention covers modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A component-positioning module applicable to an electronic device, the electronic device comprising a first component and a second component rotatable relative to the first component, the component-positioning module comprising:
   an elastic member comprising a first end, a second end and an operative portion, the elastic member being secured to the first component with the first end and the second end, and the operative portion being movable in a linear extension direction substantially perpendicular to an outer surface of the first component;
   a plurality of fastening members configured for fastening the first end and the second end to the first component;
   a plurality of adjustment elements secured between the elastic member and the first component by the fastening members respectively; and
   a positioning element configured to position the second component, the positioning element being combined with the operative portion and at least partially protruding from the outer surface;
   wherein manipulation of the fastening members deforms the plurality of adjustment elements and thereby changes a distance of the positioning element protruding from the outer surface.

2. The component-positioning module as claimed in claim 1, wherein the elastic member has a flat spring structure with a curvature or a concavity.

3. The component-positioning module as claimed in claim 1, wherein each adjustment element comprises a fastening hole allowing passage of each fastening member, and each adjustment element is deformable in an axial direction of each fastening hole.

4. The component-positioning module as claimed in claim 3, wherein at least one of the adjustment elements has a spiral cushion structure forming two terminals at different levels.

5. The component-positioning module as claimed in claim 3, wherein at least one of the adjustment elements has a cushion structure comprising a first side and a second side concaved or bent toward the same direction to define a curvature of the cushion structure.

6. The component-positioning module as claimed in claim 4, wherein at least one adjustment element is disposed between the first end and the first component, and at least one adjustment element is disposed between the second end and the first component.

7. The component-positioning module as claimed in claim 5, wherein at least one adjustment element is disposed between the first end and the first component, and at least one adjustment element is disposed between the second end and the first component.

8. An electronic device, comprising
   a first component;
   a second component pivotally connected to the first component and being rotatable relative to the first component; and
   at least one component-positioning module disposed at the first component, each component-positioning module comprising:
      an elastic member comprising a first end, a second end and an operative portion, the elastic member being secured to the first component with the first end and the second end, and the operative portion being movable in a linear extension direction substantially perpendicular to an outer surface of the first component;
      a plurality of fastening members configured for fastening the first end and the second end to the first component;
      a plurality of adjustment elements secured between the elastic member and the first component by the fastening members respectively; and
      a positioning element configured to position the second component, the positioning element being combined with the operative portion and at least partially protruding from the outer surface;
      wherein manipulation of the fastening members deforms the plurality of adjustment elements and thereby changes a distance of the positioning element protruding from the outer surface.

9. The electronic device as claimed in claim 8, wherein the elastic member has a flat spring structure with a curvature or a concavity.

10. The electronic device as claimed in claim 8, wherein each adjustment element comprises a fastening hole allowing passage of each fastening member, and each adjustment element is deformable in an axial direction of each fastening hole.

11. The electronic device as claimed in claim 10, wherein at least one of the adjustment elements has a spiral cushion structure forming two terminals at different levels.

12. The electronic device as claimed in claim 10, wherein at least one of the adjustment elements has a cushion structure comprising a first side and a second side concaved or bent toward the same direction to define a curvature of the cushion structure.

13. The electronic device as claimed in claim 11, wherein at least one adjustment element is disposed between the first end and the first component, and at least one adjustment element is disposed between the second end and the first component.

14. The electronic device as claimed in claim 12, wherein at least one adjustment element is disposed between the first end and the first component, and at least one adjustment element is disposed between the second end and the first component.

* * * * *